United States Patent
Giacomotti et al.

(10) Patent No.: US 12,455,399 B2
(45) Date of Patent: Oct. 28, 2025

(54) DIFFRACTIVE OPTICAL ELEMENT COMPRISING A METASURFACE FOR TIRF MICROSCOPY

(71) Applicants: CENTRE NATIONAL DE LA RECHERCHE SCIENTIFIQUE, Paris (FR); Université Paris-Saclay, Gif-sur-Yvette (FR)

(72) Inventors: Alejandro Giacomotti, Clamart (FR); Sophie Bouchoule, Villejuif (FR); Antu Nehuen Gortari, Paris (FR)

(73) Assignees: CENTRE NATIONAL DE LA RECHERCHE SCIENTIFIQUE, Paris (FR); Universite Paris-Saclay, Gif-sur-Yvette (FR)

( * ) Notice: Subject to any disclaimer, the term of this patent is extended or adjusted under 35 U.S.C. 154(b) by 842 days.

(21) Appl. No.: 17/771,801

(22) PCT Filed: Oct. 22, 2020

(86) PCT No.: PCT/EP2020/079768
§ 371 (c)(1),
(2) Date: Apr. 25, 2022

(87) PCT Pub. No.: WO2021/083787
PCT Pub. Date: May 6, 2021

(65) Prior Publication Data
US 2022/0381951 A1    Dec. 1, 2022

(30) Foreign Application Priority Data
Oct. 28, 2019 (FR) .................................... 1912054

(51) Int. Cl.
*G02B 1/00* (2006.01)
*G01N 21/64* (2006.01)
(Continued)

(52) U.S. Cl.
CPC ......... *G02B 1/002* (2013.01); *G01N 21/6458* (2013.01); *G01N 21/648* (2013.01);
(Continued)

(58) Field of Classification Search
CPC . G02B 1/00; G02B 1/002; G02B 1/02; G02B 5/00; G02B 5/008; G02B 5/18;
(Continued)

(56) References Cited

U.S. PATENT DOCUMENTS

| 2013/0208332 A1* | 8/2013 | Yu ........................... H01Q 15/10 977/773 |
| 2020/0264343 A1* | 8/2020 | Han ........................ G02B 1/14 |

FOREIGN PATENT DOCUMENTS

| WO | 2010/032157 A1 | 3/2010 |
| WO | 2014/003529 A2 | 1/2014 |
| WO | 2014/003529 A3 | 1/2014 |

OTHER PUBLICATIONS

Mendoza, et al., "Tailored optical polarization in nanostructured metamaterials", Phys. Rev. B 94, Nov. 21, 2016.

* cited by examiner

*Primary Examiner* — Jie Lei
(74) *Attorney, Agent, or Firm* — Maier & Maier, PLLC

(57) ABSTRACT

Disclosed is a diffractive optical element includes a substrate (BS) having a first surface and a second surface opposite the first surface, being transparent to light in at least one spectral range and having, in the spectral range, a refractive index that is greater than that of water, at least one metasurface able to diffract light radiation of wavelength λ within the spectral range, incident with an angle of incidence, according to a diffracted radiation, so that the diffracted radiation propagates in the substrate and reaches the second surface of the substrate at a diffracted angle $\theta_d$ that is greater than or equal to a limit angle ($\theta_c$) of total internal reflection between
(Continued)

the substrate and water, the metasurface being designed to have, for the angle of incidence, a transmission with a 0 order of diffraction below 5% and a transmission of the diffracted radiation corresponding to a −1 or +1 order of diffraction above 50%.

11 Claims, 7 Drawing Sheets

(51) Int. Cl.
*G02B 5/00* (2006.01)
*G02B 5/18* (2006.01)
*G02B 21/16* (2006.01)
*G02B 27/56* (2006.01)
*G02B 21/06* (2006.01)

(52) U.S. Cl.
CPC ........... *G02B 5/008* (2013.01); *G02B 5/1809* (2013.01); *G02B 5/1842* (2013.01); *G02B 5/1861* (2013.01); *G02B 5/1871* (2013.01); *G02B 21/16* (2013.01); *G02B 27/56* (2013.01); *G01N 2021/6463* (2013.01); *G02B 21/06* (2013.01)

(58) Field of Classification Search
CPC .. G02B 5/1809; G02B 5/1819; G02B 5/1842; G02B 5/1861; G02B 5/1871; G02B 21/0072; G02B 21/0076; G02B 21/06; G02B 21/16; G02B 27/56; G02B 27/58; G01N 21/648; G01N 21/6458; G01N 21/64; G01N 2021/6463; B82Y 10/00; B82Y 20/00; B82Y 30/00
USPC ............... 359/558, 615, 565, 566, 573, 576; 977/773, 774, 712, 721, 723
See application file for complete search history.

DIFFRACTIVE OPTICAL ELEMENT COMPRISING A METASURFACE FOR TIRF MICROSCOPY

CROSS-REFERENCE TO RELATED APPLICATIONS

This application is a National Stage of International patent application PCT/EP2020/079768, filed on Oct. 22, 2020, which claims priority to foreign French patent application No. FR 1912054, filed on Oct. 28, 2019, the disclosures of which are incorporated by reference in their entirety.

FIELD OF THE INVENTION

The present invention relates to the field of TIRF microscopy (or total-internal-reflection-fluorescence microscopy).

BACKGROUND

Below, a component that comprises a periodic or quasi-periodic repetition of an elementary pattern, of dimension and of period smaller than one wavelength of radiation incident thereon, and that scatters said incident radiation and, on so doing, modifies its phase and its amplitude, will be referred to as a metasurface.

Total-internal-reflection-fluorescence (TIRF) microscopy is a fluorescence-microscopy technique in which the excitation of fluorescent molecules in the observed sample is confined to a region of nanoscale thickness, located in the immediate vicinity of the slide sample holder. It allows, in particular, structures and processes localized to a cell membrane to be selectively observed, with a spatial resolution in an axial direction much better than the diffraction limit. Furthermore, with respect to more conventional epifluorescence techniques, it makes it possible to obtain a better contrast in the fluorescence image and to decrease the effects of cell photo-bleaching and radiation damage.

The principle on which TIRF microscopy is based is illustrated in FIG. 1A. The case considered is that of a substrate SB of refractive index $n_2$, having a surface Se making contact with an ambient medium MA of index $n_1 < n_2$. For example, the substrate SB may consist of a slide sample holder, or of an element made of glass on which such a slide is placed, while the ambient medium MA may be an aqueous solution containing, in suspension, cells labeled with fluorophores. A light beam FLI, delivered through the substrate SB, is incident on the surface Se; its direction of propagation makes, to the normal $z_s$ to the surface, an angle $\theta$ larger than a critical value $\theta_c$ (limit angle)

$$\theta_c = \arcsin\frac{n_1}{n_2}. \tag{1}$$

Therefore, the beam FLI undergoes total internal reflection (the reference FLR designates the reflected beam) and an evanescent wave OE appears in the ambient medium MA. This evanescent wave has an intensity that decreases exponentially with distance z from the surface S: $I(z)=I_0 e^{-z/\delta}$, where the penetration length $\delta$ is given by $$\delta = \frac{\lambda}{\sqrt{4\pi\left(n_2^2 \sin^2\theta_d - n_1^2\right)}}, \tag{1'}$$

$\lambda$ being the wavelength of the light radiation. The evanescent wave excites the fluorophores contained in the ambient medium, but only over a thickness of the order of $\delta$, because therebeyond its intensity rapidly becomes negligible. By way of example, for $\lambda=488$ nm, $n_2=1.514$ (BK7 glass), $n_1=1.33$ (water) and $\theta=67°>\theta_c \cong 61.45°$, it is found that $\delta \cong 93$ nm, this meaning that only the fluorophores located in a layer of about 100 nm thickness are excited and contribute to the production of a fluorescence image.

FIG. 1B illustrates the configuration most commonly used in TIRF microscopy.

In the case of FIG. 1B, the same microscope objective OBJ, which is located on the side of the substrate opposite the medium MA, is used both to generate the evanescent waves via total internal reflection and to collect the fluorescence radiation. The objective is generally an oil immersion objective and may have a high numerical aperture (NA), for example of the order of 1.45, this in turn allowing a high lateral spatial resolution (resolution perpendicular to the direction z) to be obtained because the lateral spatial resolution is given by $d=\lambda/2NA$. In addition, an objective OBJ with a high NA is essential because it allows the incident light beam FLI to be deflected with respect to the optical axis (thus a large deviation of the incident beam FLI by the lens is obtained) and the beam FLI is thus able to propagate with an angle of incidence $\theta$ that is sufficiently large to obtain total internal reflection. However, such a lens is very expensive and introduces significant aberrations. In addition, alignment of such an assembly is complex.

The invention aims to overcome the abovementioned drawbacks of the prior art. More particularly, it aims to provide a diffractive optical element comprising a metasurface making it possible, for example, to perform TIRF microscopy, and to dispense with the use of the high-numerical-aperture objectives of the prior art.

SUMMARY OF INVENTION

To this end, one subject of the invention is a diffractive optical element comprising:
- a substrate having a first surface and a second surface opposite the first surface, which substrate is transparent to light in at least one spectral range and has, in said spectral range, a refractive index higher than that of water;
- at least one metasurface made of a dielectric material and placed on said first surface of the substrate, the metasurface being formed through the repetition of a pattern that is periodic in two directions, x and y, that are perpendicular to each other and parallel to a surface of the substrate, said pattern comprising a sub-pattern comprising a first strip segment that is rectilinear along y,
- the metasurface comprising a first strip (M1) of dashes (P) in the direction y, said strip of dashes being formed from said sub-pattern,
- said periodic pattern further comprising a second strip segment that is rectilinear in the direction y, so that the metasurface comprises a second strip (M2) that is continuous in a direction y,
- said metasurface being suitable for diffracting light radiation of wavelength $\lambda$ comprised in said spectral range, and incident with an angle of incidence, to form diffracted radiation, said diffracted radiation being formed in such a way that it propagates through the substrate, and strikes said second surface of the substrate at a diffracted angle $\theta_d$ larger than or equal to a limit angle $\theta_c$ of total internal reflection between said substrate and water, the metasurface being configured to have, at said angle of incidence, a transmittance lower than 5% for the order of diffraction 0 and a transmittance higher than 50% for diffracted radiation corresponding to an order of diffraction −1 or +1.

According to particular embodiments of the invention:

- within the pattern, the area of the first strip is smaller than the area of the second strip and wherein a width of the first strip is comprised between 30 nm and 500 nm, a width of the second strip is comprised between 100 nm and 700 nm and a length of the dash is comprised between 60 nm and 800 nm;
- the sub-pattern comprises a disk, said disk being placed between two successive dashes of said first strip;
- the dimension of the pattern in the direction x is such that $P_x < \lambda/n_{eau}$, with $n_{eau}$ the refractive index of water;
- the total dimension $x_{MS}$ of the metasurface in the direction x is such that $x_{MS} < 2 \cdot e \cdot \sin \theta_d$, with e a thickness of the substrate;
- the dimension of the pattern in the direction y is comprised between 300 nm and 1000 nm;
- the refractive index of the material of the metasurface is higher than the refractive index of a material of the substrate;
- the diffractive optical element comprises a plurality of metasurfaces placed on said first surface of the substrate, a dimension in said direction x of the pattern of each metasurface being different, so that each metasurface is suitable for diffracting light radiation of wavelength comprised in said range and different from the wavelength diffracted by the other metasurfaces.

Another subject of the invention is a device for imaging a sample by total-internal-reflection-fluorescence microscopy comprising an optical element comprising:

- at least one light source suitable for emitting, in said spectral range, said light radiation incident on said diffractive optical element with said angle of incidence, said light radiation, after diffraction by said diffractive optical element, producing evanescent waves in at least one region of the second surface of the substrate;
- a sample placed in correspondence with at least one region of the second surface where said evanescent waves are produced and generating fluorescence radiation excited by said evanescent waves;
- a detector suitable for detecting said fluorescence radiation emitted by said sample.

Yet another subject of the invention is a device for detecting a biological sample via surface plasmon resonance comprising a diffractive optical element, said diffractive optical element comprising:

- a plurality of metasurfaces, a dimension in said direction x of the pattern of each metasurface being different, so that the radiation diffracted by each metasurface strikes said second surface of the substrate at a different diffracted angle $\theta_d$;

said device further comprising:

- at least one light source suitable for emitting, in said spectral range, said light radiation incident on said diffractive optical element with said angle of incidence;
- a sample comprising at least a second substrate, a metal layer placed above the second substrate and a layer to be analyzed placed above the metal layer, said sample being placed above the first substrate so that said diffracted radiation is reflected at least partially by the metal layer of the sample,
- said diffractive optical element further comprising an optical coupling element suitable for coupling said light radiation reflected by the sample to free space;
- a detector suitable for detecting the intensity of said light radiation reflected by the sample and coupled to free space by said coupling element,
- at least one metasurface being configured so that said diffracted angle associated with the metasurface produces, on reflection from the metal surface, a resonant excitation of surface plasmons and an at least partial absorption of said diffracted radiation.

According to one particular embodiment of the invention, the optical coupling element comprises at least one exit metasurface formed through the repetition of a pattern that is periodic in two directions, x and y, that are perpendicular to each other and parallel to a surface of the substrate, said pattern comprising a sub-pattern comprising a first strip segment that is rectilinear along y, said exit metasurface being placed on said first surface of the substrate.

BRIEF DESCRIPTION OF THE DRAWINGS

Other features, details and advantages of the invention will become apparent on reading the description, which is given with reference to the appended drawings, which are given by way of example and which show, respectively.

In the figures, unless otherwise indicated, the elements are not to scale.

DETAILED DESCRIPTION

Figure 1A:
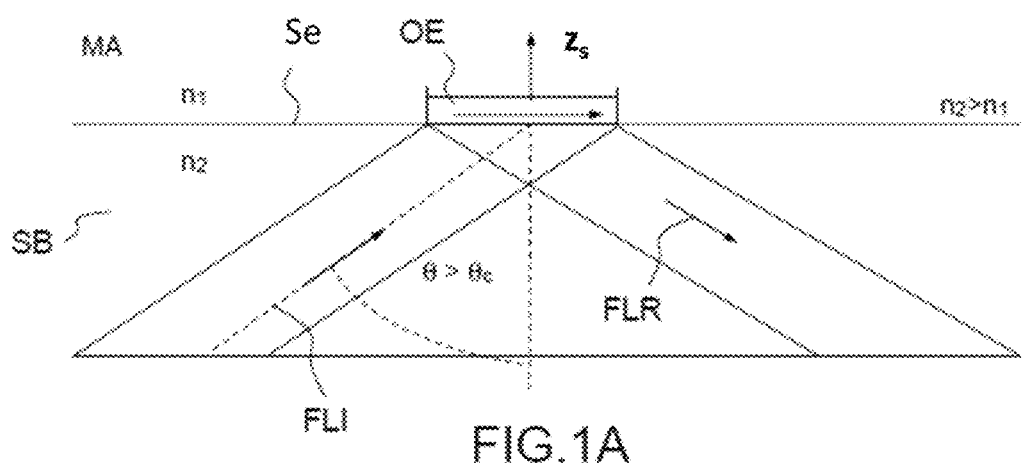
FIG. 1A and FIG. 1B, the TIRF-microscopy technique known from the prior art.
Figure 1B:
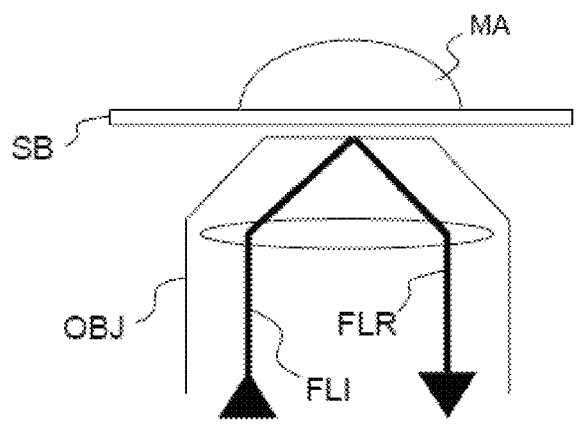
Figure 2:
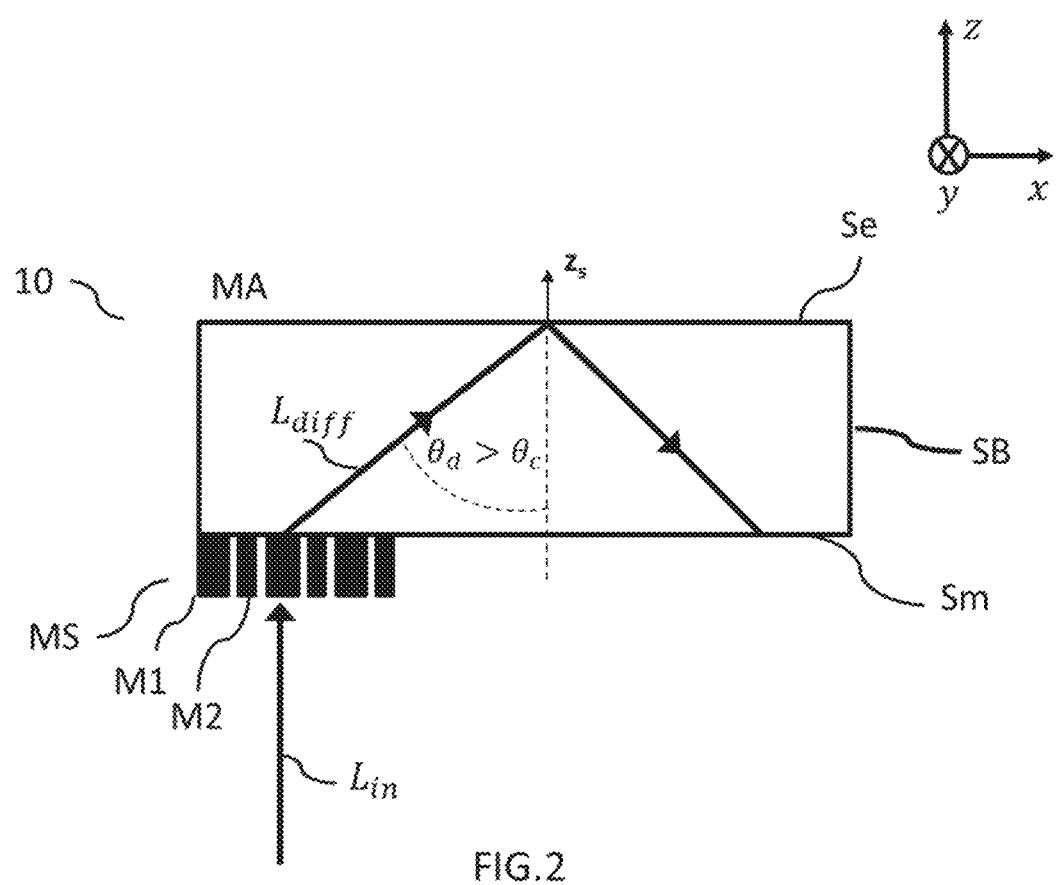
FIG. 2, a schematic view of a diffractive optical element according to the invention.

FIG. 2 shows a schematic view of a diffractive optical element according to the invention. This diffractive optical element 10 comprises a substrate SB, of index $n_2$, having a first surface Sm and a second surface Se opposite the first surface, which substrate is transparent to light in at least one spectral range and has, in said spectral range, an $n_2$ higher than that of water. The surface Se of the substrate makes contact with an ambient medium MA of index $n_1 < n_2$.

In addition, the diffractive optical element of the invention comprises at least one metasurface MS made of a dielectric material, which metasurface is placed on the first surface of the substrate Sm. According to one preferred embodiment of the invention, this metasurface is made of titanium dioxide. Alternatively, according to another embodiment of the invention, this metasurface is made of silicon.

According to the invention, the metasurface is suitable for diffracting light radiation $L_{in}$ of wavelength $\lambda$ comprised in said spectral range, and incident with an angle of incidence $\theta_i$, to form diffracted radiation $L_{diff}$, said diffracted radiation being formed in such a way that it propagates through the substrate, and strikes said second surface $\theta_c$ of the substrate at a diffracted angle $\theta_d$ larger than or equal to a limit angle $\theta_c$ of total internal reflection between said substrate and water. By way of non-limiting example, the wavelength $\lambda$ of the light radiation $L_{in}$ is comprised between 400 nm and 800 nm.

In addition, the structure of the metasurface is configured so that the metasurface has, at said angle of incidence $\theta_i$, a transmittance lower than 5% for the order of diffraction 0 and a transmittance higher than 50% for diffracted radiation $L_{diff}$ corresponding to an order of diffraction −1 or +1.

Below and in all the figures, the diffracted radiation $L_{diff}$ represents the order of diffraction into which the incident radiation is mainly diffracted (or redirected).

Below, the angle $\theta_d$ that the diffracted radiation $L_{diff}$ makes to the normal $z_s$ to the second surface of the substrate will be called the "diffraction angle" or "diffracted angle". According to one preferred embodiment of the invention, the two opposite surfaces $S_e$ and $S_m$ of the substrate are parallel and the diffraction angle is equal to the angle made between a normal of the first surface Sm and the diffracted radiation. In the rest of the description of the invention, non-limitingly, the two surfaces $S_e$ and $S_m$ of the substrate are parallel.

According to one embodiment of the invention, the substrate is made of optical glass that is transparent in the 400 nm-800 nm spectral range, as are the borosilicate glasses and BK-7 glass. In this embodiment, as mentioned above, the limit angle $\theta_c$ is equal to $\theta_c \approx 61°$, and hence the diffraction angle $\theta_d$ is larger than 61°.

Alternatively, according to another embodiment, the substrate is made of quartz, or of fused silica.

The diffractive optical element 10 of the invention has a very low transmittance as regards the order of diffraction 0 and allows, just like a blazed grating, an intensity of the incident radiation to be mainly redirected, with respect to the order of diffraction +1, into an order of diffraction −1 (or vice versa) with an angle $\theta_d$ large enough to allow a total internal reflection (TIR) of the diffracted radiation when the ambient medium MA (above the substrate) is aqueous. The total internal reflection of the diffracted radiation within the substrate allows evanescent waves to be excited in the ambient medium MA above the region in which the diffracted radiation undergoes a total internal reflection.

Thus, the optical element of the invention is particularly suitable for TIRF-microscopy applications, which require evanescent waves to be excited at the interface between a substrate (typically a glass slide) and a sample preserved in an aqueous medium. Specifically, in TIRF microscopy, it is desirable for the transmittance of the order of diffraction 0 to be as low as possible in order to decrease background noise resulting from the epifluorescence radiation emitted by a sample containing fluorophores when incident radiation is transmitted.

Figure 3A:
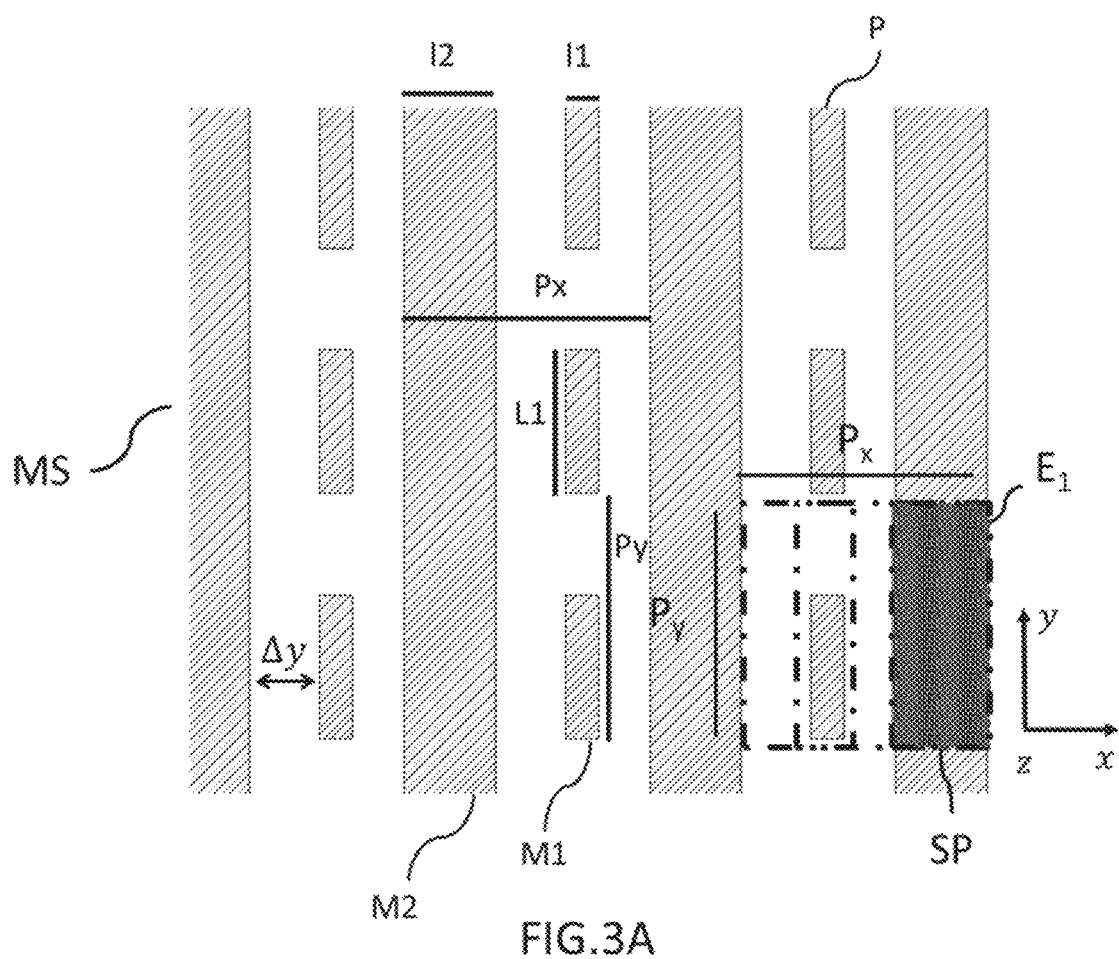
FIG. 3A and FIG. 3B, a schematic view and a graph showing a diffraction efficiency of a diffractive optical element according to a first embodiment of the invention, respectively.
Figure 4A:
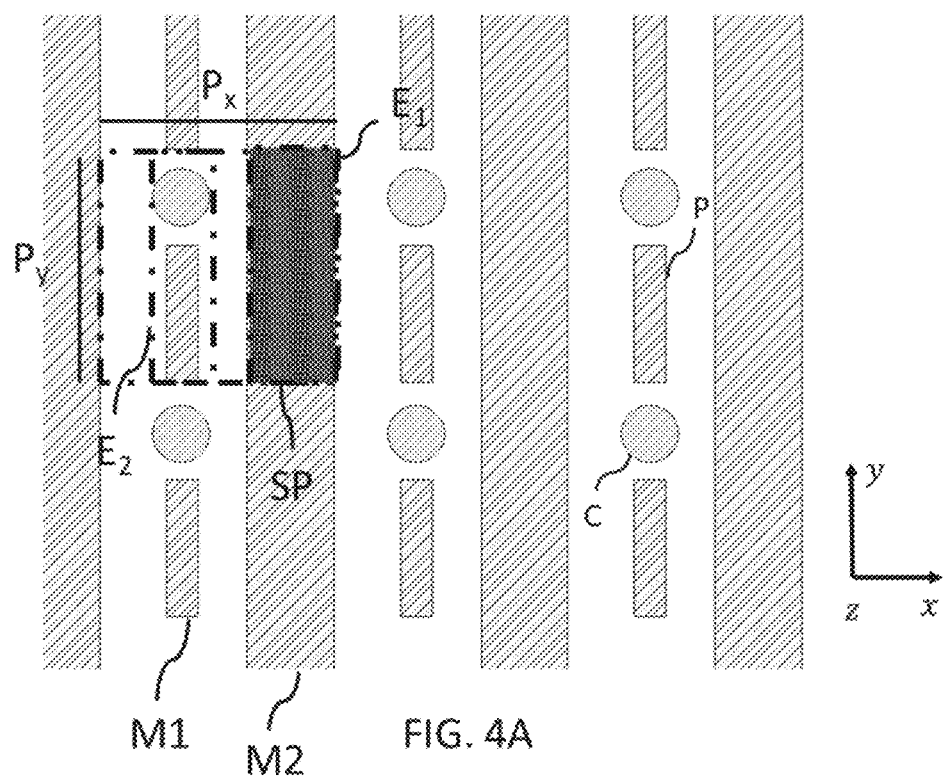
FIG. 4A and FIG. 4B, a schematic view and a graph showing a diffraction efficiency of a diffractive optical element according to one variant of the first embodiment of the invention, respectively.

To achieve the aforementioned effects, using numerical simulations, the inventors have developed a particular type of metasurface that will now be described with reference to a first embodiment of the invention, which embodiment is detailed in FIG. 3A, and to a variant of the first embodiment, which is illustrated in FIG. 4A. In all the embodiments of the invention, the metasurface is formed from a pattern that is periodic in two directions, x and y, that are perpendicular to each other and parallel to a surface of the substrate, the dimension Px of the pattern being smaller than the wavelength $\lambda$ of the incident radiation. The pattern comprises a sub-pattern $E_2$ comprising a first strip segment P that is rectilinear along y.

The metasurfaces of the invention are produced on the substrate using methods known to those skilled in the art. By way of non-limiting example, they may be produced by using electron-beam lithography or nanoimprint lithography then structuring by plasma etching to form the patterns and, if necessary, the sub-patterns. These methods are fast, repeatable and relatively inexpensive.

As known, the dimension $P_x$ of the pattern in the direction x is related to the order of diffraction m, to the wavelength of the incident radiation $\lambda$ and to the diffraction angle $\theta_d$ by the following equation:

$$P_x = \frac{m\lambda}{n_2 \sin(\theta_d)}. \tag{2}$$

Here, the dimension of the pattern $P_x$ in the direction x may be understood to mean the period of repetition of the pattern of the metasurface.

Based on equation (2) and equation (1), in all the embodiments of the invention, the dimension $P_x$ of the pattern in the direction x is such that:

$$P_x < \lambda/n_1.$$

Thus, the diffraction angle of the diffracted beam will be larger than the critical angle at the interface between the surface Se of the substrate and the ambient medium MA of index $n_1$. When the ambient medium MA is water, the dimension $P_x$ of the pattern in the direction x is such that $P_x < \lambda/1.33$.

As shown in equation (2), the smaller the dimension of the pattern in the direction x, the larger the diffraction angle. In addition, as equation (1') shows, the larger the diffraction angle, the smaller the penetration length of the evanescent waves. Thus, with regard to application to TIRF microscopy, the smaller the dimension of the pattern of the metasurface, the more the excitation of the fluorophores of a sample will be localized to a thin layer, thus improving the axial resolution of the device.

In order to maximize the efficiency of the order of diffraction −1 or +1 and in order to limit the transmission of the order 0, in all embodiments, the refractive index $n_{mat}$ of the material of the metasurface must be higher than the refractive index $n_2$ of the material of the substrate. This condition is a result of the relationship between the diffraction efficiency of the various orders of diffraction and the coupling between the Bloch modes excited in the metasurface in the direction z by incident radiation $L_{in}$. As regards transmission of the orders of diffraction 0, 1 and −1, the excited propagative Bloch modes possess coupling coefficients with substantially the same amplitude but different phase profiles and thus add constructively for the order of diffraction −1 or +1 but destructively for the order 0. Thus, with the metasurface according to the invention, the incident radiation is mainly directed into the order of diffraction +1 or −1.

FIG. 3A illustrates a schematic view of a diffractive optical element 10 according to a first embodiment of the invention. This first embodiment comprises a first strip M1 of dashes P, i.e. a strip that is non-continuous, in the direction y, said strip of dashes being formed from said sub-pattern E2. The dashes P correspond to a repetition along the y-axis of a first rectilinear strip segment. In addition, the periodic pattern E1 further comprises a second strip segment, called the second segment SP, that is rectilinear in the direction y and that extends all the way across the dimension along y of the pattern E1, so that the metasurface comprises a second strip M2 that is continuous in a direction y.

In this embodiment, the metasurface therefore comprises an array along x of continuous strips M2 that are rectilinear along y with, between each continuous strip, a dashed strip M1 that also extends along y.

In order to generate, within a pattern of the metasurface, an effective-index gradient that is sufficient to achieve an effective-medium regime, and thus to ensure the incident radiation is deflected or diffracted, it is necessary, within a pattern E1, for the area of the first strip (and therefore of a dash P), to be smaller than the area of the second segment SP. These areas are determined via numerical simulations so as to generate a sufficient effective-index variation between the region formed by the dashes and the region formed by the continuous strip M1.

Likewise, the spacing between the dashes P influences the effective index of the region formed by the dashes and is determined by numerical simulation.

The relative position $\Delta y$, of the dashed first strip M1 with respect to the continuous second strip M2 has the effect of generating a break in symmetry in the direction x, this allowing the metasurface to redirect the intensity of the incident radiation mainly into one order of diffraction rather than another. This relative position of the first strip with respect to the second strip depends on the dimensions of all the elements of the metasurface and is optimized by numerical RCWA simulation (RCWA being the acronym of rigorous coupled-wave analysis).

By way of non-limiting example, in this first embodiment the width l1 of the first strip is comprised between 30 nm and 500 nm, a width l2 of the second strip is comprised between 100 nm and 700 nm and a length of the dash P is comprised between 60 nm and 800 nm. The dimension $P_x$ of the pattern in the direction x is comprised between 300 and 1000 nm and the dimension $P_y$ in the direction y of the sub-pattern is comprised between 300 and 1000 nm. The depth of the strips (dimension of the metasurface in the direction z) is comprised between 100 and 500 nm. Typically, the wavelength 80 is comprised between 400 nm and 800 nm.

Figure 3B:
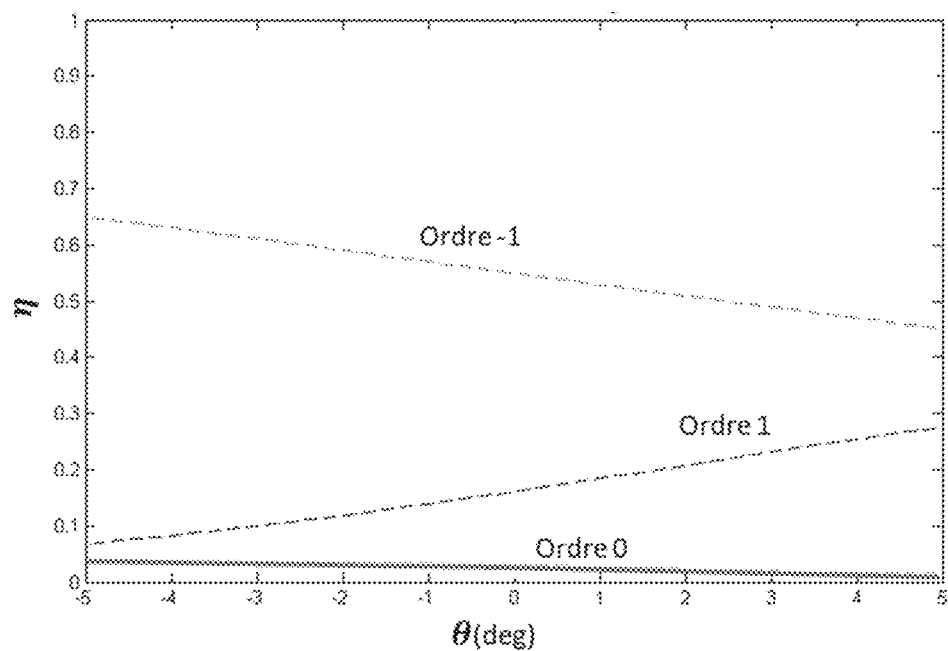

FIG. 3B illustrates the diffraction efficiency of the diffractive optical element according to the first embodiment of the invention, for a range of angles of incidence comprised between −5° and 5°. In this example, which is given non-limitingly, the width of the first strip is equal to 160 nm, a width of the second strip is equal to 61 nm and a length of the dash is equal to 322 nm. The relative position of the first strip with respect to the second strip is equal to 186 nm. The dimension Px of the pattern in the direction x is equal to 465 nm and the dimension Py of the sub-pattern in the direction y is equal to 465 nm. These transmittances are obtained at 640 nm.

The efficiency of the order of diffraction −1 is higher than the efficiency of the order of diffraction +1 and very clearly higher than the efficiency of the order of diffraction 0. For an angle of incidence of 0°, the efficiency of the order of diffraction −1 is equal to 55%, the efficiency of the order of diffraction +1 is equal to 15% and the efficiency of the order of diffraction 0 is about 3%. In this example, the diffraction angle $\theta_d$ is equal to 65°.

The structure of the metasurface of FIG. 3A therefore allows the incident radiation to be mainly redirected into the order of diffraction −1, while keeping the transmittance of the order 0 very low.

FIG. 4A illustrates a schematic view of a diffractive optical element according to one variant of the first embodiment of the invention. In this variant, each sub-pattern E2 of the metasurface of the diffractive optical element comprises a disk C placed between two successive dashes P of the first strip M1. The first strip M1 is therefore formed from an alternation of dashes and of disks C in the direction y.

In this variant of the first embodiment, the diameter of the disk C and its position relative to the dash P in the direction y in a sub-pattern E2 are optimized by RCWA simulation so as to generate a suitable effective index in the sub-pattern E2 with respect to the effective index of the pattern E1.

By way of non-limiting example, in this variant of the first embodiment the diameter of the disks is comprised between 30 and 500 nm and its separation, in the direction y, from the dash of the sub-pattern is comprised between 20 and 100 nm.

Figure 4B:
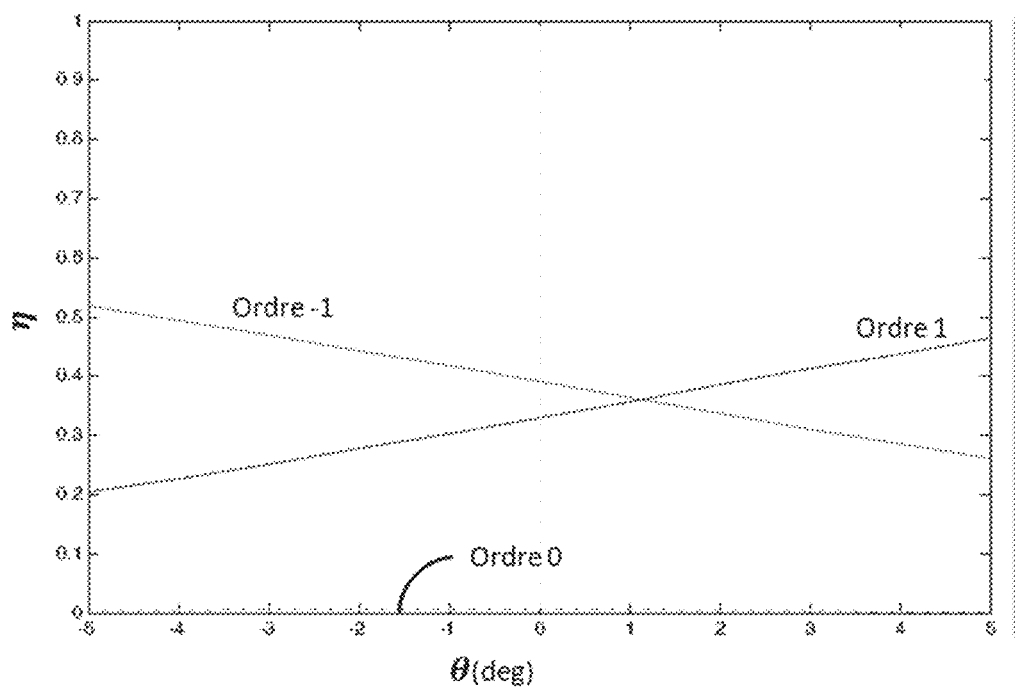

FIG. 4B illustrates the diffraction efficiency of the diffractive optical element according to the variant of the first embodiment of the invention, for a range of angles of incidence comprised between −5° and 5°. In this example, which is given non-limitingly, the width of the first strip M1 is equal to 170 nm, a width of the second strip M2 is equal to 31 nm and a length of the dash P is equal to 246 nm. The relative position of the first strip M1 with respect to the second strip M2 is equal to 123 nm. The diameter of the disks is equal to 112 nm and its separation, in the direction y, from the dash of the sub-pattern is equal to 53 nm. The dimension Px of the pattern in the direction x is equal to 465 nm and the dimension Py in the direction y of the sub-pattern is equal to 465 nm. These transmittances are obtained at 640 nm.

In this variant, the metasurface therefore comprises an array along x of continuous strips M2 that are rectilinear along y with, between each continuous strip, a dashed strip M1 that also extends along y, the dashed strip comprising disks C between each dash.

The efficiency of the orders of diffraction −1 and +1 is very clearly higher than the efficiency of the order of diffraction 0. Thus, for an angle of incidence of −5°, the efficiency of the order of diffraction −1 is equal to 51%, the efficiency of the order of diffraction +1 is equal to 20% and the efficiency of the order of diffraction 0 is lower than 1%. The efficiency of the order of diffraction +1 is comparable to the efficiency of the order of diffraction −1. In this example, the diffraction angle $\theta_d$ is equal to 65°.

The structure of the metasurface of FIG. 4A therefore allows the incident radiation to be mainly redirected into the order of diffraction −1, while keeping the transmittance of the order 0 extremely low.

Figure 5:
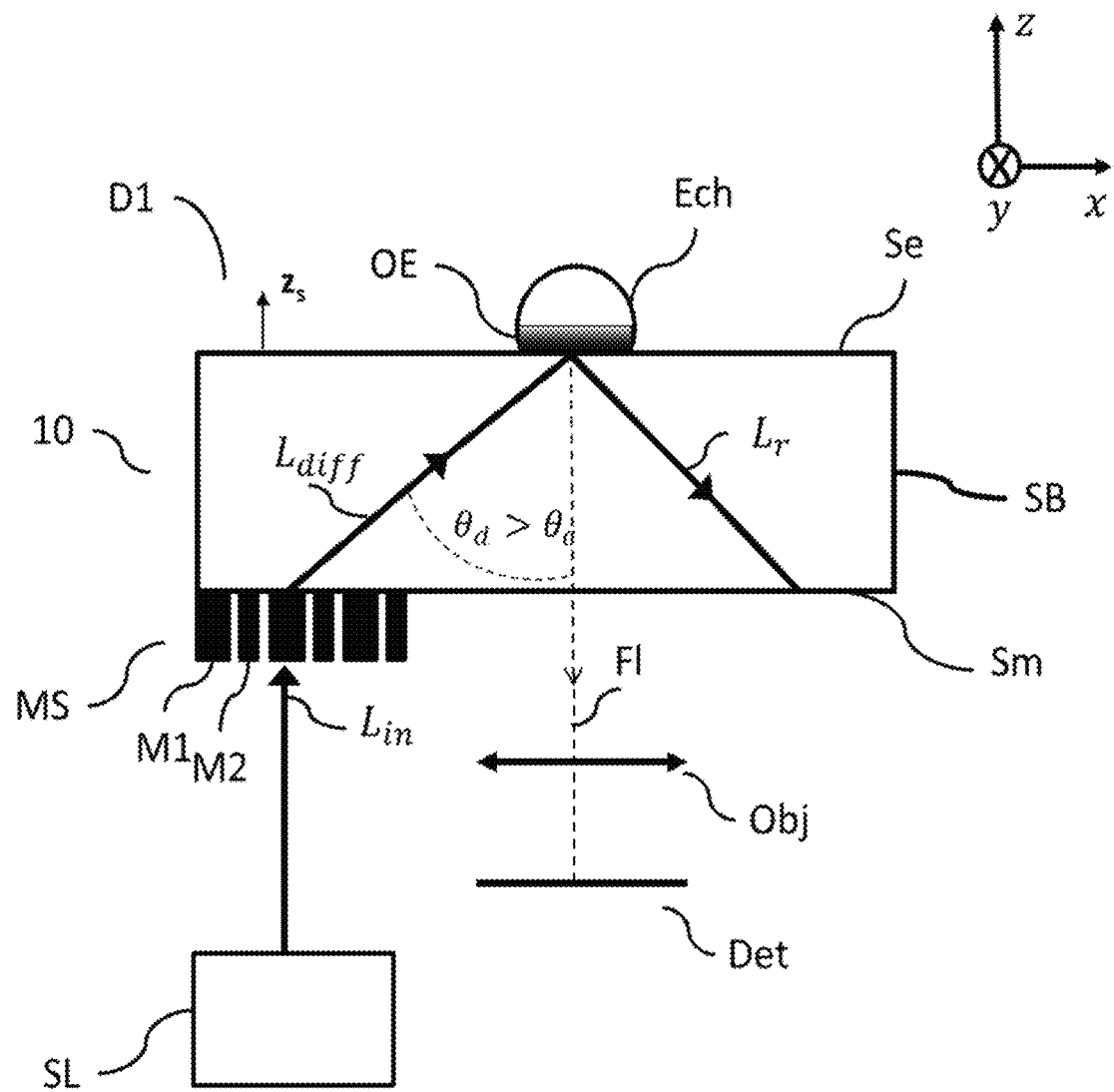
FIG. 5, a schematic view of a device for imaging a sample by TIRF microscopy comprising a diffractive optical element according to the invention.

Another subject of the invention is a device D1 for imaging a sample by total-internal-reflection-fluorescence microscopy comprising a diffractive optical element 10 such as described above. A schematic view of the device D1 is illustrated in FIG. 5.

The device D1 comprises at least one light source SL for emitting light radiation $L_{in}$ in the spectral range in which the substrate is transparent. The diffractive optical element is configured so that light radiation emitted by the light source SL at the wavelength λ strikes the metasurface MS with the angle of incidence $\theta_i$ so that the light radiation $L_{diff}$ diffracted by said diffractive optical element is reflected via total internal reflection by the second face of the substrate and produces evanescent waves OE in at least one region of the second surface Se of the substrate.

The device D1 further comprises a sample Ech placed in correspondence with at least one region of the second surface where said evanescent waves are produced and generating fluorescence radiation Fl excited by said evanescent waves.

In one embodiment, the sample Ech is a sample of a cell culture, the cells being preserved in an aqueous medium and cultured on a slide made of a material that is identical to that of the substrate SB. Since the diffraction angle $\theta_d$ of the diffracted radiation $L_{diff}$ is larger than the critical angle of total internal reflection between said substrate and water, the total internal reflection of the radiation diffracted at the interface between the second surface Se and the aqueous medium generates evanescent waves OE. These waves will excite fluorophores that are located, in the sample, in a thin layer (of about 100 nm thickness) and that will contribute to the production of a fluorescence image.

The device D1 in addition comprises an objective Obj that is suitable for collecting the fluorescence radiation F1 and for directing it toward a detector Det suitable for detecting said fluorescence radiation emitted by the sample.

Since the angle of the propagation of the diffracted radiation remains constant within the substrate, the diffracted radiation propagates the entire length of the substrate and generates evanescent waves in each region of reflection from a surface of the substrate. This means that when the dimension in the direction x of the substrate allows it, there will be a plurality of regions of reflection, from a surface of the substrate, in which evanescent waves are produced, and therefore a plurality of regions in which fluorescence radiation may be excited within a sample.

The transverse dimensions (in the directions x and y) of the regions in which evanescent waves are produced are set by the smallest of the transverse dimension of the metasurface MS and of the diameter of the beam of incident radiation $L_{in}$.

The total lateral dimension in the direction x of the metasurface MS is set by the diffraction angle $\theta_d$ and the thickness e of the substrate. Specifically, the diffracted radiation reflected by the second surface Se of the substrate (which is called the reflected radiation $L_r$) must not be extracted from the substrate via the metasurface MS. The lateral dimension $x_{MS}$ of the metasurface in the direction x is therefore such that $x_{MS} < 2e \sin \theta_d$.

The device D1 allows TIRF microscopy to be performed on a sample Ech using a diffractive optical element 10 according to the invention. This diffractive optical element 10 allows the incident radiation to be deviated enough that it propagates, through the substrate of the diffractive optical element, in a direction suitable for generating evanescent waves at the interface between the substrate of the optical diffractive element and the sample.

Thus, the D1 device allows structures and processes localized to a cell membrane to be selectively observed, with a spatial resolution in an axial direction much better than the diffraction limit.

In addition, the device D1 allows TIRF microscopy to be performed without using an objective of high NA, greatly decreasing the cost of the device D1 with respect to a TIRF-microscopy device of the prior art.

Furthermore, since the transmittance of the order of diffraction 0 of the diffractive optical element of the device D1 is very low, the intensity of the epifluorescence radiation emitted by the sample as a result of direct transmission of the incident radiation is greatly decreased. The background noise produced by this radiation is decreased and the contrast of the fluorescence image of the thin layer of the sample is improved.

According to one embodiment of the invention, the path of the incident light radiation between the light source SL and the diffractive optical element is through free space. This experimental arrangement is simple and allows the excitation region of the sample to be easily controlled. In this embodiment, the light source may be a laser source or an LED source placed in immediate proximity to the metasurface MS. When the light source is an LED source placed in immediate proximity to the metasurface MS, it is advantageous to place the sample Ech above a region, of the second surface Se of the substrate, in which evanescent waves are produced that is transversely distant in the direction x from the metasurface MS. In other words, it is advantageous to place the sample above a region corresponding to a plurality of reflections from the surfaces of the substrate. Specifically, the intensity of parasitic radiation, i.e. of radiation emitted by the LED, scattered by the metasurface and that illuminates the sample, will be greatly decreased. Thus, the background noise produced by this parasitic radiation is decreased and contrast is improved.

Alternatively, according to another embodiment, the path of the incident light radiation, between the light source SL and the diffractive optical element, is through optical fiber and the device D1 comprises a fiber-optic coupler (not shown in FIG. 5) allowing the light radiation $L_{in}$ to be directed toward the metasurface MS of the diffractive optical element. The advantage of this embodiment is that it does not require subsequent alignment after suitable placement of the fiber-optic coupler. In this embodiment, the light source SL is a laser source.

Alternatively, according to another embodiment, the objective Obj is also suitable for collimating the radiation $L_{in}$ incident on the metasurface MS. In this embodiment, the device comprises another lens (not shown) that focuses the incident radiation $L_{in}$ emitted by the light source SL onto the object focal plane of the objective Obj, the image of the radiation then being focused at infinity in the image plane of the objective Obj. In this embodiment, the angle of incidence $\theta_i$ of the incident radiation is configured so that the reflected radiation $L_r$ is not collected by the objective.

According to one embodiment of the invention, the diffractive optical element comprises a plurality of metasurfaces $MS_1$, $MS_2$, $MS_n$, placed on said first surface of the substrate Sm, a dimension Px in said direction x of the pattern of each metasurface being different. Thus, each metasurface is configured to diffract light radiation $L_{in}$ of wavelength different from the wavelength diffracted by the other metasurfaces. In this embodiment of the invention, the imaging device D1 of FIG. 5 has the advantage of being wavelength-tunable.

Another subject of the invention is a device D2 for detecting a biological sample via surface plasmon resonance comprising a diffractive optical element according to the invention. A schematic view of the device D2 is illustrated in FIG. 6.

Figure 6:
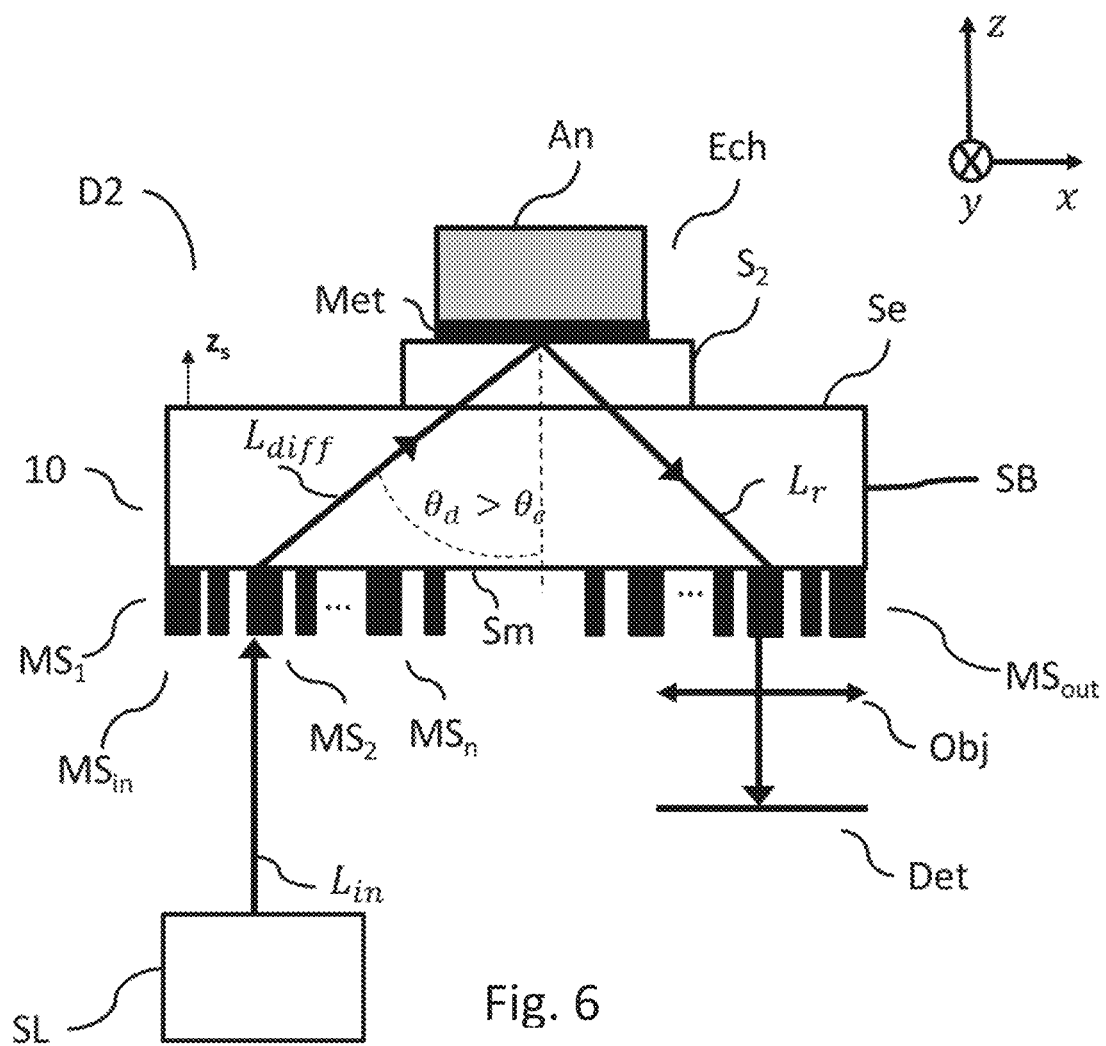
FIG. 6, a schematic view of a device for detecting a biological sample via surface plasmon resonance comprising a diffractive optical element according to the invention.

The diffractive optical element of the device of FIG. 6 comprises a plurality n of metasurfaces $MS_1$, $MS_i$, ..., $MS_n$, a dimension Px in said direction x of said pattern of each metasurface being different, so that the radiation $L_{diff}$ diffracted by the i-th metasurface $MS_i$ strikes said second surface Se of the substrate at an angle $\theta_{d,i}$.

The device D2 of FIG. 6 further comprises at least one light source SL suitable for emitting light radiation $L_{in}$ in the spectral range in which the substrate is transparent. The source is configured so that the light radiation is incident on the metasurfaces with the angle of incidence $\theta_i$.

The device D2 of FIG. 6 further comprises a sample Ech comprising at least a second substrate $S_2$, a metal layer Met placed above the second substrate and a layer An to be analyzed placed above the metal layer.

According to one embodiment of the invention, the layer to be analyzed is an aqueous layer.

The sample Ech is placed above the first substrate SB so that said diffracted radiation is reflected at least partially by the metal layer of the sample, the reflected radiation $L_r$ being formed thereby.

The diffractive optical element of the device D2 further comprises an optical coupling element $MS_{out}$ placed on the first surface Sm of the substrate and suitable for coupling said light radiation $L_r$ reflected by the sample to free space.

According to one embodiment of the invention, the optical coupling element $MS_{out}$ comprises at least one exit metasurface formed through the repetition of a pattern $E_1$ that is periodic in two directions, x and y, that are perpendicular to each other and parallel to a surface of the substrate, said pattern comprising a sub-pattern $E_2$ comprising a first strip segment P that is rectilinear along y, said exit metasurface being placed on said first surface Sm of the substrate the metasurface.

According to one preferred embodiment of the invention, the optical coupling element $MS_{out}$ is a "mirror image" of the diffractive optical element $MS_{in}$. In other words, the optical element $MS_{out}$ and the diffractive optical element $MS_{in}$ are axisymmetric, each with respect to the other, about an axis parallel to the direction z.

The device D2 of FIG. 6 comprises a detector Det suitable for detecting the intensity of said light radiation reflected by the sample and coupled to free space by said coupling element.

According to one embodiment, the device D2 in addition comprises an objective Obj suitable for collecting the reflected radiation $L_r$ coupled to free space by said coupling element, and for directing it toward the detector Det.

The diffractive optical element comprises at least one metasurface $MS_i$ configured so that the diffraction angle $\theta_i$ associated with the metasurface produces, on reflection from the metal surface, a resonant excitation of surface plasmons and an at least partial absorption of said diffracted radiation $L_{diff}$. When the incident radiation is deviated by a metasurface $MS_i$ with an associated diffraction angle $\theta_{d,i}$ that allows excitation of surface plasmon resonance on reflection by the metal layer Met, the diffracted radiation is partially absorbed and the intensity of the reflected radiation $L_r$ decreases.

According to one embodiment, a chemical functionalization layer configured to allow adsorption of specific biological molecules that it is desired to detect, and which are present in the layer An to be analyzed, is placed above the metal layer Met of the sample.

In order to detect the presence of molecules, it is therefore necessary to illuminate, using the light source SL, each metasurface MS successively and to detect, using the detector Det, the intensity of the reflected radiation $L_r$. Let $\theta_{SPR,0}$ be the angle of excitation of the surface plasmon resonance of the layer Met in the absence of molecules to be detected from the layer to be analyzed An. The surface plasmon resonance is then excited by the k-th metasurface $MS_k$, with which is associated a diffraction angle $\theta_{d,k}=\theta_{SPR,0}$. For this single metasurface $MS_k$, the intensity of the reflected radiation $L_r$ is decreased compared to the intensity of the reflected radiation $L_r$ obtained with the other metasurfaces.

When the molecules to be detected are present within the layer to be analyzed, they will adsorb to the metal layer Met, thus changing the angle at which the surface plasmon resonance is excited. Let $\theta_{SPR,1}$ then be the angle at which the surface plasmon resonance is excited.

That molecules have adsorbed to the metasurface is therefore detected when a change is observed in the metasurface $MS_m$ (with which is associated a diffraction angle $\theta_{d,m}=\theta_{SPR,1}$) that excites the surface plasmon resonance, for which metasurface the intensity of the reflected radiation $L_r$ decreases.

The device D2 of FIG. 6 makes it possible to carry out biological detection via surface plasmon resonance with an assembly that is greatly simplified with respect to the devices of the prior art. More precisely, this device allows detection via surface plasmon resonance without requiring the wavelength or the angle of incidence $\theta_i$ of the incident radiation $L_{in}$ to be varied. In addition, this device is simple to align, unlike the devices of the prior art, which mostly use coupling prisms to excite the surface plasmon resonance, such prisms being bulky and complex to align.

The invention claimed is:

1. A diffractive optical element comprising:
    a substrate having a first surface and a second surface opposite the first surface, which substrate is transparent to light in at least one spectral range and has, in said spectral range, a refractive index higher than that of water;
    at least one metasurface made of a dielectric material and placed on said first surface of the substrate, the metasurface being formed through a repetition of a pattern that is periodic in two directions, x and y, that are perpendicular to each other and parallel to a surface of the substrate, said pattern comprising a sub-pattern comprising a first strip segment that is rectilinear along y,
    the metasurface comprising a first strip of dashes in the direction y, said strip of dashes being formed from said sub-pattern,
    said periodic pattern further comprising a second strip segment that is rectilinear in the direction y, so that the metasurface comprises a second strip that is continuous in a direction y,
    said metasurface being suitable for diffracting light radiation of wavelength $\lambda$ comprised in said spectral range, and incident with an angle of incidence, to form diffracted radiation, said diffracted radiation being formed in such a way that it propagates through the substrate, and strikes said second surface of the substrate at a diffracted angle $\theta_d$ larger than or equal to a limit angle $\theta_c$ of total internal reflection between said substrate and water,
    said metasurface being configured to have, at said angle of incidence, a transmittance lower than 5% for the order of diffraction 0 and a transmittance higher than 50% for diffracted radiation corresponding to an order of diffraction −1 or +1.

2. The diffractive optical element as claimed in claim 1, wherein, within the pattern, an area of the first strip is smaller than an area of the second strip and wherein a width of the first strip is comprised between 30 nm and 500 nm, a width of the second strip is comprised between 100 nm and 700 nm and a length of the dash is comprised between 60 nm and 800 nm.

3. The diffractive optical element as claimed in claim 1, wherein the sub-pattern comprises a disk, said disk being placed between two successive dashes of said first strip.

4. The diffractive optical element as claimed in claim 1, wherein the dimension (Px) of the pattern in the direction x is such that $P_x < \lambda/n_{eau}$, with $n_{eau}$ a refractive index of water.

5. The diffractive optical element as claimed in claim 1, wherein the total dimension $x_{MS}$ of the metasurface in the direction x is such that $x_{MS} < 2 \cdot e \cdot \sin \theta_d$, with e a thickness of the substrate.

6. The diffractive optical element as claimed in claim 1, wherein the dimension (Py) of the pattern in the direction y is comprised between 300 nm and 1000 nm.

7. The diffractive optical element as claimed in claim 1, wherein the refractive index of the material of the metasurface is higher than the refractive index of a material of the substrate.

8. The diffractive optical element as claimed in claim 1, comprising a plurality of metasurfaces placed on said first surface of the substrate, a dimension in said direction x of the pattern of each metasurface being different, so that each metasurface is suitable for diffracting light radiation of wavelength comprised in said range and different from the wavelength diffracted by the other metasurfaces.

9. A device for imaging a sample by total-internal-reflection-fluorescence microscopy comprising a diffractive optical element as claimed in claim 1 and comprising:
    at least one light source suitable for emitting, in said spectral range, said light radiation incident on said diffractive optical element with said angle of incidence, said light radiation, after diffraction by said diffractive optical element, producing evanescent waves in at least one region of the second surface of the substrate;
    a sample placed in correspondence with at least one region of the second surface where said evanescent waves are produced and generating fluorescence radiation excited by said evanescent waves;
    a detector suitable for detecting said fluorescence radiation emitted by said sample.

10. A device for detecting a biological sample via surface plasmon resonance comprising a diffractive optical element as claimed in claim 1, said diffractive optical element comprising:
    a plurality of metasurfaces, a dimension (Px) in said direction x of a pattern of each metasurface being different, so that the radiation diffracted by each metasurface strikes said second surface of the substrate at a different diffracted angle $\theta_d$;
    said device further comprising:
    at least one light source suitable for emitting, in said spectral range, said light radiation incident on said diffractive optical element with said angle of incidence;
    a sample comprising at least a second substrate, a metal layer placed above the second substrate and a layer to be analyzed placed above the metal layer, said sample being placed above the first substrate so that said diffracted radiation is reflected at least partially by the metal layer of the sample,
    said diffractive optical element further comprising an optical coupling element suitable for coupling said light radiation reflected by the sample to free space;
    a detector suitable for detecting the intensity of said light radiation reflected by the sample and coupled to free space by said coupling element,
    at least one metasurface being configured so that said diffracted angle associated with the metasurface produces, on reflection from the metal surface, a resonant excitation of surface plasmons and an at least partial absorption of said diffracted radiation.

11. The device as claimed in claim 10, wherein said optical coupling element comprises at least one exit metasurface formed through the repetition of a pattern that is periodic in two directions, x and y, that are perpendicular to each other and parallel to a surface of the substrate, said pattern comprising a sub-pattern comprising a first strip segment that is rectilinear along y, said exit metasurface being placed on said first surface of the substrate.

* * * * *